United States Patent Office 2,792,685
Patented May 21, 1957

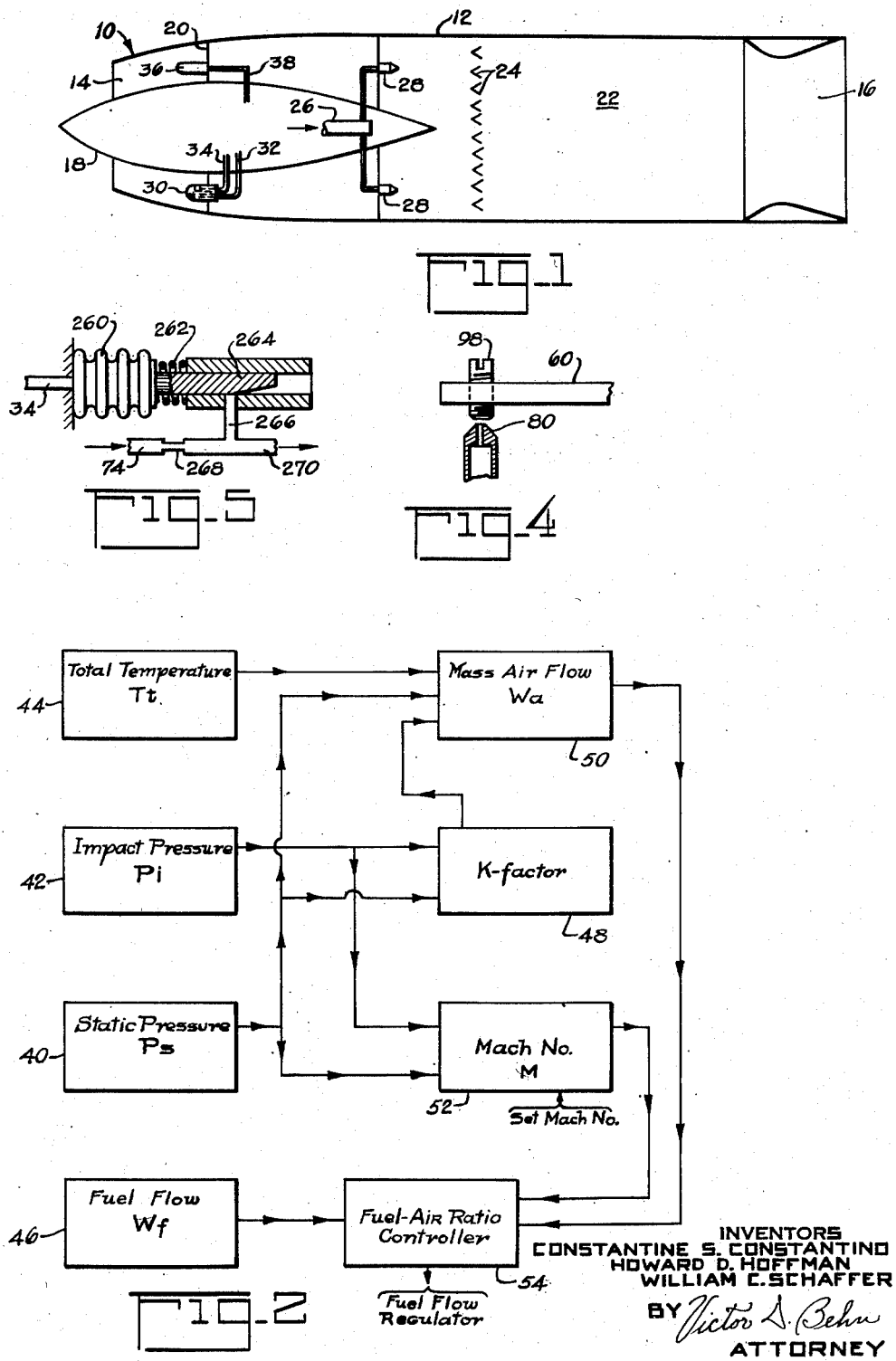

2,792,685

JET ENGINE CONTROL SYSTEM UTILIZING LOGARITHMIC SIGNALS

Constantine S. Constantino, Maywood, and Howard D. Hoffman and William C. Schaffer, Fair Lawn, N. J., assignors to Curtiss-Wright Corporation, a corporation of Delaware Application October 30, 1951, Serial No. 253,878

12 Claims. (Cl. 60—39.28)

This invention relates to jet power plants for aircraft, pilot controlled or remotely controlled as in the case of aircraft guided missiles, and is particularly directed to a power control system for such a power plant.

An object of the present invention comprises the provision of a novel system for controlling the rate of fuel supply to the combustion chamber of a jet engine so as to control the output thrust of said engine and thereby the Mach number of the aircraft speed. In accordance with the invention means are provided for measuring the Mach number of the aircraft speed, and the mass air flow rate and the fuel flow rate to the combustion chamber of the jet engine, said latter measurement being combined to control the fuel flow rate. Jet engines, however, travel at supersonic velocities so that accurate measurement of the mass air flow rate to the engine combustion chamber is quite difficult. Accordingly, a further object of the invention comprises the provision of a novel arrangement for measuring the mass flow-rate into a duct of a compressible fluid, such as air, entering said duct at supersonic velocities.

Other objects of the invention will become apparent upon reading the annexed detailed description in connection with the drawing in which;

Fig. 1 is a schematic view of a ram jet power plant illustrating the location of the sensing elements of the control system;

Fig. 2 is a block diagram of a ram jet control system embodying the invention;

Fig. 4 is an enlarged view of a nozzle and baffle construction used in Fig. 3; and Fig. 5 is a sectional view illustrating a modified construction of an element of the control system of Fig. 3.

Figure 3:
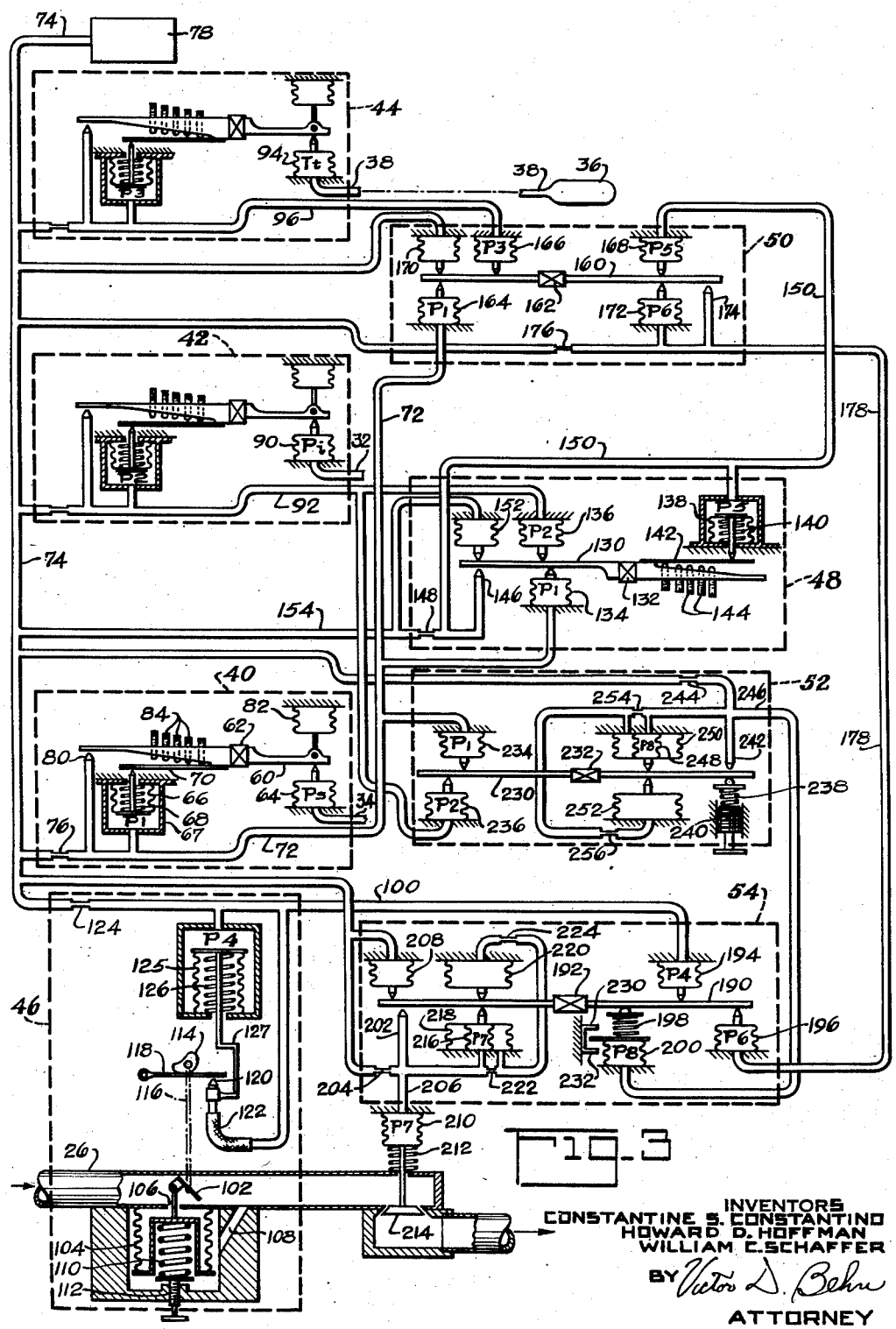
Fig. 3 is a detail schematic view of a ram jet control system embodying the invention.

Referring first to Fig. 1 of the drawing, a ram jet power plant for aircraft is schematically indicated at 10 as comprising an open ended duct having a forwardly directed air entrance opening 14 and a rearwardly directed nozzle 16. A center body structure 18 is co-axially supported adjacent the forward end of the duct 12 by a plurality of circumferentially-spaced struts 20, the engine auxiliary equipment including its power control system generally being housed in such a center body structure. The ram jet duct 12 includes a combustion chamber 22 disposed downstream of said center body structure and a flame holder structure schematically indicated at 24, is provided for said combustion chamber. Fuel for combustion in the combustion chamber 22 is supplied from a supply conduit 26 from which it is distributed to a plurality of fuel nozzles 28. As illustrated, said fuel nozzles may be supported on the struts 20 at their downstream edges. The ram jet structure so far described is conventional.

In flight, air enters the ram jet duct 12 through its opening 14 at supersonic velocities and therefore accurate measurement of the mass rate of air flow into said duct is difficult. In the case of air entering a duct, such as the duct 12, at supersonic velocities, it is known that the mass rate of air flow (Wa) into said duct can be expressed as follows:

$$Wa = \frac{PsK}{\sqrt{Tt}}$$

where $Ps$ is the static pressure of said air and $Tt$ is the total temperature of said air. By total temperature ($Tt$) is meant the sum of the static temperature of said air plus the temperature rise produced by its velocity relative to the temperature measuring device. In addition the factor K is a variable which can be expressed as follows:

$$K = A'f(M)$$

where $f(M)$ is a known function of Mach No. (M) and $A'$ is an area factor which depends on the area of the duct entrance opening and on the specific design of said entrance section of the duct as well as on the Mach No. of the entering air flow. Accordingly the variable factor K will depend on the design of the ram jet duct and on the Mach No. of the entering flow.

It is also known that Mach No. (M) of a moving column of air can be expressed as a function of the ratio of the impact pressure of said air ($Pi$) to the static pressure ($Ps$) of said air. Therefore K is a function of the ratio of $Pi$ to $Ps$, the particular function depending on the area factor $A'$ so that for a given engine 10, the variable factor K can be determined by measuring $Pi$ and $Ps$ of the air entering the ram jet duct 12. These measurements of $Pi$ and $Ps$ together with the area factor $A'$ will determine the variable K. Then by combining this K determination with measurements of $Ps$ and $Tt$ it is possible to determine the mass air flow rate ($Wa$) into said duct in accordance with the equation for $Wa$ set forth above.

In order to measure $Pi$ and $Ps$, of the air entering the duct 12, a Pitot-static tube 30 is supported at the upstream end of one of the struts 20 such that pressures $Pi$ and $Ps$ are transmitted through passages 32 and 34, respectively, extending from the tube 30. In order to measure $Tt$ of the air entering the duct 12, a bulb 36 containing a gaseous fluid is supported at the upstream end of one of the struts 20 in the path of the air flowing through the duct 12 for providing a pressure proportional to $Tt$ in a passage 38 extending from said bulb. Obviously, however, for the purpose of measuring the rate of mass air flow into the duct 12, the temperature responsive bulb 36 and Pitot-static tube 30 could be disposed at other locations in the duct 12 or in the free air stream surrounding said duct.

Fig. 2 is a block diagram of a ram jet engine control system embodying the invention. As illustrated the blocks 40, 42 and 44 designate apparatus for producing signals of $Ps$, $Pi$ and $Tt$ respectively and block 46 designates apparatus for producing a signal of the rate of fuel flow of ($Wf$). The $Pi$ and $Ps$ signals are combined by the apparatus of block 48 to produce a K factor signal. The $Tt$, $Ps$ and K factor signals are combined by the apparatus of the block 50 to produce a $Wa$ signal in accordance with the previously expressed relation $$Wa = \frac{PsK}{\sqrt{Tt}}$$

The $Pi$ and $Ps$ signals are also combined by the apparatus of the block 52 to produce a signal which depends on the deviation of the Mach No. of the flight speed of the engine 10 from a set or desired Mach No. This Mach No. deviation signal is combined with the $Wf$ and $Wa$ signals in the apparatus of block 54 to provide a signal which is used to regulate the fuel supply to the engine. For a given Mach No. deviation signal, the apparatus of block 54, provides a signal which regulates the fuel flow to maintain a constant fuel-air ratio ($Wf/Wa$) of the combustible mixture supplied to the combustion chamber 22.

In this way the output thrust of the ram jet engine 10 is controlled to maintain a flight speed of a desired Mach No.

The expression $$Wa = \frac{PsK}{\sqrt{Tt}}$$

for mass air flow involves multiplication and division of the various variables. The control system can be simplified by providing signals proportional to the logarithms of the measured variables which can then be combined by simple addition and subtraction to produce a measurement which is proportional to the logarithm of the mass air flow rate. Thus, from the above equation for $Wa$ it follows that $$\log Wa = \log Ps + \log K - \tfrac{1}{2} \log Tt$$

Such a logarithmic system has the further advantage in that a change of output signal is always proportional to the percent change in the input signal.

Obviously a control system operating in accordance with the block diagram of Fig. 2 may have many different forms. For example, the system may be primarily electric, hydraulic or pneumatic or it may be a combination thereof. Fig. 3 illustrates details of a pneumatic control system operable in accordance with the block diagram of Fig. 2. In Fig. 3, the signals produced are proportional to the logarithms of the variables and by means of lever systems said signals are converted to turning moments which are added and/or subtracted to produce the desired control operation. For convenience, the system of Fig. 3 has been divided into blocks corresponding to and designated by the same reference numerals as the blocks of Fig. 2.

Referring now to Fig. 3, the device 40 includes a lever 60 pivotally supported at 62. A bellows 64 is in communication with the Pitot static tube passage 34, said bellows being anchored at one end and having its other end contacting the lever 60 to apply a counterclockwise turning movement to said lever as viewed in the drawing. An opposite and balancing turning movement is applied to the lever 60 by a bellows 66 and spring 68. One end of said bellows 66 is fixed with a housing 67 and the other end of said bellows is connected to the free end of a leaf spring 70 secured at one end to the lever 60. The interior of the housing 67 and exterior of the bellows 66 is in communication with an output passage 72 and with an air pressure supply passage 74 through a restriction 76. Air under pressure is supplied to the passage 74 from a reservoir 78, suitable means being provided (not shown) for maintaining a substantially constant pressure in the passage 74. A nozzle 80 through which air bleeds is also in communication with the air supply passage 74 through the restriction 76. A portion of the lever 60 overlies the open end of said nozzle such that said lever portion acts as an air baffle to vary the air flow resistance of the nozzle 80 in response to pivotal movements of the lever 60 thereby varying the air pressure in the bellows 66 to balance the turning moments acting on said lever. A third bellows 82 also acts on the lever 60. The bellows 82 is sealed and evacuated and has the same diameter and moment arm as the bellows 60 whereby the bellows 82 compensates for the effect of variations in atmospheric pressure on the bellows 64. The lever 60 has a plurality of adjustable screws 84 engageable by the leaf spring 70 to vary the effective length of said spring in response to deflection of said spring relative to the lever 60. The adjustable screw 84 are set so that the pressure $P1$ on the bellows 66 and in the output passage 72 is proportional to the logarithm of the pressure in the bellows 64 which latter pressure is proportional to the static pressure ($Ps$) of the air entering the engine duct 12.

The details of a device such as the device 40, for providing an output pressure which is proportional to the logarithm of an input pressure are more fully disclosed in copending application Serial No. 212,268, filed February 23, 1951, now Patent No. 2,754,053, issued July 10, 1956.

As illustrated in Fig. 3, the device 42 is similar to the device 40 except, in place of the input static pressure responsive bellows 64 of the device 40, the device 42 has a bellows 90 which, through the Pitot-static tube passage 32, is responsive to the impact pressure of the air entering the engine duct 12. Accordingly the output pressure $P2$ of the device 42, in its output passage 92, is proportional to the logarithm of the impact pressure $Pi$.

Likewise the device 44 is similar to the device 40. Thus in place of the input static pressure responsive bellows 64 of the device 40, the device 44 has an input temperature responsive bellows 94 which through the passage 38 and bulb 36 is subjected to a pressure proportional to the total temperature ($Tt$) of the air entering the duct 12. Therefore the output pressure $P3$ of the device 44, in its output passage 96, is proportional to the logarithm of $Tt$.

For maximum accuracy, the range of output pressure of each of the devices 40, 42 and 44, should be as large as possible. In addition, it obviously is desirable to keep the air loss or consumption through the nozzles of said devices to a low value, the rate of said air loss increasing with the output pressure of said devices. The same output pressure range of 3 to 15 pounds per square inch (p. s. i.) has been selected for each of the devices 40, 42 and 44. By thus limiting the output pressure of each device 40, 42 and 44 to a predetermined pressure range, the output pressure of each device is not proportional to the logarithm of its input pressure from a strict mathematical standpoint. For each of said device, its output pressure is then equal to a constant plus the logarithm of its input pressure. Thus, $$P1 = a + \log Ps$$
$$P2 = b + \log Pi$$
$$P3 = c + \log Tt$$

where $a$, $b$ and $c$ are constants. The plot of each such equation on semi-log paper is a straight line so that in a broader sense, as herein used, the output pressure of each device 40, 42 and 44 is considered to be proportional to the logarithm of its input pressure.

Each of the device 40, 42 and 44 will have a different range of input pressures so that by providing each said device with the same range of output pressure of 3 to 15 p. s. i., the logarithmic bases of said devices will differ. The logarithmic base of each said device can readily be determined. For example consider the device 40. The above relation between its input and output pressures can be expressed as follows:

$$R_1^{P1-a} = Ps$$

where $R_1$ is the logarithmic base. If the engine is to be operated in atmospheric conditions in which $Ps$ varies between 2 and 4 p. s. i. while $P1$ varies between 3 and 15 p. s. i. then, $$\frac{R_1^{15-a}}{R_1^{3-a}} = \frac{4}{2}$$

$$R_1^{12} = 2$$

$$R_1 = 1.0595$$

The device 40 may be calibrated as follows: Assuming again that the device 40 is to have a range of output pressure ($P1$) between 3 and 15 p. s. i. and is to have a range of input pressure $Ps$ between 2 and 4 p. s. i. First the compression of the spring 68 is adjusted by an adjustable screw (not shown) so that the leaf spring 70 is flat. Then the minimum static pressure (Ps) of 2 p. s. i. is applied to the bellows 64. The nozzle 80 and the baffle portion of the lever 60 are then adjusted relative to each other to produce an output pressure in the bellows 66 of about 4 p. s. i. For purpose of this adjustment the baffle portion of the lever 60 may have a screw 98 adjustable toward and away from the nozzle 80 as illustrated in Fig. 4. The first screw 84 (the screw closest to the lever pivot 62) is then adjusted against the leaf spring to produce the required minimum output pressure of 3 p. s. i. The input pressure to the bellows 64 is slowly increased until the output pressure begins to depart from that required by the relation $P1 = a + \log Ps$ where $a$ can readily be determined from the known limit values of P1 and Ps. When this departure occurs, the second screw 84 is adjusted to obtain the desired output pressure. This is continued until the device 40 is calibrated throughout its entire working range. Obviously the devices 42 and 44 may be calibrated in a similar manner. As illustrated in said copending application the moment arms of the bellows are adjustable in order that they may be set so that it is possible to obtain the desired range of output pressures.

The device 46 is designed to provide an output pressure in the passage 100 which is proportional to the logarithm of the rate of fuel flow to the combustion chamber through the fuel supply line 26. For this purpose the fuel line 26 is provided with a butterfly-type valve 102 connected to a bellows 104. The inside of the bellows 104 is subjected to the fuel pressure on the upstream side of the restriction 102 through the passage 106 and the outside of the bellows is subjected to the fuel pressure on the downstream side of said valve through the passage 108. A compression spring 100 acts against the bellows to urge the butterfly valve 102 in a closing direction. A screw 112 is provided for varying or setting the force exerted by the spring 110. With this arrangement, the bellows 104 automatically operates to position the butterfly valve 102 to maintain a constant fuel pressure difference thereacross as determined by the magnitude of the force exerted by the spring 110.

The butterfly valve 102 is connected to a cam 114, by means schematically indicated 116, for joint rotation. A member 118 is urged into engagement with said cam, said member 118 having a portion overlying an air bleed nozzle 120 to constitute a baffle member for said nozzle. Rotation of the cam 114 moves the baffle member 118 relative to the nozzle 120 to vary the flow resistance of the nozzle 120. The nozzle 120 is connected to the output passage 100 through a flexible connection 122, said output passage being connected to the air supply passage 74 through a restriction 124. The nozzle 120 is supported from a bellows 125 by a connection 127, said bellows being subjected to the pressure in the output line 100. A spring 126 acts against the bellows 125 and the output pressure in the line 100 for urging the nozzle 120 toward the baffle member 118.

With this construction of the device 46, any increase in the rate of fuel flow in the line 26 causes the bellows to adjust the butterfly valve 102 in an opening direction. An opening adjustment of the valve 102 produces a corresponding rotation of the cam 114 to move the baffle member 118 toward the nozzle 120 thereby increasing the output pressure in the line 100. This increase in the output pressure of the device 46 acts on the bellows 125 to cause a follow-up adjustment of the nozzle away from the baffle member 118. Accordingly the output pressure of the device 46 is proportional to the angular position of the butterfly valve 102 as modified by the cam 114. It is known that the angular position of a butterfly valve which, as the valve 102, is positioned to maintain a constant pressure differential thereacross is approximately proportional to the logarithm of the liquid flow past the valve. Accordingly the cam 114 is designed or modified as indicated by test results so that the output pressure P4 of the device 46 in the line 100 is proportional to the logarithm of the rate of fuel flow (Wf) in the fuel line 26.

As in the case of the devices 40, 42 and 44, the device 46 is designed to have an output pressure range of 3 to 15 p. s. i. for the range of fuel flows for which the power plant 10 is designed. Accordingly the relation between the output pressure (P4) of the device 46 and the rate of fuel flow (Wf) can be expressed as follows:

$$P4 = d + \log Wf$$

where $d$ is a constant.

The logarithmic base of the device 46 and the constant $d$ can be determined as in the case of the device 40. Furthermore the device 46 can be calibrated in a manner similar to the device 40, except in the case of the device 46 the profile of the cam 114 would have to be modified by experiment instead of, as in the case of the device 40, by varying the adjustment of the screws 84.

As previously stated the variable factor K can be expressed as follows:

$$K = f\left(\frac{Pi}{Ps}\right)$$

so that $$\log K = f'(\log Pi - \log Ps)$$

where $f'$ is a function which depends on Mach No. (M) and the entrance design of the duct 12. If K were simply equal to the ratio of Pi to P2 then a pressure proportional to log K could readily be obtained by a lever arrangement providing an output turning movement equal to the difference of turning moments respectively proportional to log Pi and log Ps. The device 48 comprises such a lever system and in which means are included for modifying the output to conform to said function $f'$.

The device 48 comprises a lever construction somewhat similar to the devices 40, 42 and 44. The device 48 has a lever 130 pivoted at 132. A first bellows 134 exerts a clockwise turning moment on the lever 130 (as viewed in the drawing) said bellows communicating with the output pressure P1 in the line 72 of the device 40. A second bellows 136 exerts a counterclockwise turning movement on the lever 130, said latter bellows communicating with the output pressure P2 in the line 92 of the device 42. The turning moments exerted by the bellows 134 and 136 are balanced by a third bellows 138 and its spring 140 which exerts a clockwise turning movement on the lever 130 through a leaf spring 142 secured at one end to the lever 130. The lever 130 has a plurality of screws 144 projecting therefrom to vary the effective length of the spring 142 in response to deflection of said spring. The exterior of the bellows 138 and a nozzle 146 are in communication with each other and are in communication with the air supply line 74 through a passage 150 and a restriction 148. A portion of the lever 130 overlies the open end of the nozzle 146 to act as a baffle member therefor. With this arrangement the lever 130 varies the flow resistance of the nozzle so that the turning moment exerted by the bellows 138 and its spring 140 balances the turning moments exerted by the bellows 134 and 136. The pressure (P5) on the bellows 138 is the output pressure of the device 48. The purpose of the adjustable screws 144 and the spring 140 and 142 is to introduce the previously discussed function F' in the output of the device 48. The device 48, like the devices 40, 42, 44, and 46, is designed for a predetermined output pressure range of 3–15 p. s. i.

In calibrating the device 48 it is necessary to compensate for the differences in the logarithmic bases of the input pressures. Assuming for the moment that the pressures P1 and P2 were expressed as follows:

$$P1 = \log Ps$$
$$P2 = \log Pi$$

and that said logarithms were to the same base. Then since $$\log K = f'(\log Pi - \log Ps)$$

the area and diameter of the bellows 134 and 136 could be made such that the turning moments exerted by said bellows were proportional to P1 and P2 respectively. Actually, however, as already stated the pressures P1 and P2 are expressed by the following equations:

$$P1 = a + \log_{R_1} Ps$$
$$P2 = b + \log_{R_2} Pi$$

Where $R_1$ and $R_2$ are the logarithmic bases and $a$ and $b$ are constants all of which result from and can be determined from the pressure limits imposed on the system as previously described. These constants and differences in the logarithmic bases obviously must be considered in determining the turning moments to be exerted by the input pressures P1 and P2 on the lever 130.

As is known a logarithm to one base can be converted to another base. Thus the above equation for P1 can be converted from the logarithmic base $R_1$ to the logarithmic base $R$ as follows:

$$P1 = a + \frac{\log_n R}{\log_n R_1} \log_R Ps$$

$$= a + A \log_R Ps$$

where $n$ is any convenient base so that A is a constant determined by R and $R_1$. Similarly the above equation for P2 can be written as follows:

$$P2 = b + B \log_R Pi$$

where B is a constant corresponding to the constant A and determined by the logarithmic bases.

The constants A and B are taken into account by setting the lengths of the turning moment arms of the bellows 134 and 136 respectively in proportion to the reciprocals of said constants, assuming said bellows to be of equal diameter. Obviously said constants can also be taken into account by differences in the diameters of said bellows.

The constants $a$ and $b$ represent a constant turning moment which is included in the turning moment applied by the pressures P1 and P2 and which must be removed in order that $$\log K = f'(\log Pi - \log Ps)$$

For this purpose a fourth bellows 152 is added to the device 48, said bellows being connected directly to the constant pressure air supply line 74 through the passage 154. Each constant $a$ and $b$ can be determined as previously described and the turning moment to be applied by the bellows 152 is equal to but opposite in direction to the algebraic sum of the turning moments exerted by the pressures of $a$ and $b$ in bellows 134 and 136 respectively.

After compensating for the differences in the logarithmic bases of the input pressures, the calibration of the device 48 may be completed as follows: For simplicity flight at a particular altitude is assumed thereby determining Ps and the corresponding value of P1. The Mach No. (M) is a known function of the ratio of P1/Ps so that for given values of M covering the flight speed range of the engine corresponding values of P1 can be computed. Then for each said value of Pi the corresponding values of P2 can be computed. In addition for each engine there is a particular relation between K and M which can be determined so that the value of K for each said value of M can also be determined. Then for each said value of K the corresponding value of P5 can be computed. In this connection it should be noted that, as in the case of the devices 40, 42, 44 and 46, because of the limits (3–15 p. s. i.) previously imposed on the output pressure P5, said pressure instead of being equal to log K will be expressed as follows:

$$P5 = e + \log R_5 K$$

where $e$ is a constant which can readily be determined from the known limits of P5 and K, and $R_5$ is the logarithmic base of device 48 which can be determined as described in connection with the device 40. Accordingly a predetermined relation between P5 and M can be determined. Pressures P1 and P2 corresponding to the minimum Mach No. M are then applied to the bellows 134 and 136 respectively. The nozzle 146 and baffle portion of the lever 130 are positioned relative to each other to provide an output pressure P5 in the bellows 138 of about 4 p. s. i. The first screw 144 (the one closest to the pivot 132) is then adjusted to bring the output pressure P5 to the minimum value of 3 p. s. i. The input pressure P2 is successively raised to values corresponding to the successively higher values of M (P1 being constant because of the above assumption of flight at a constant altitude) until the output pressure P5 departs from its said relation with M. Then the second screw 144 is adjusted to obtain an output pressure P5 as determined by its relation to M. This is continued until all the screws 144 are set to obtain the proper output pressure P5 throughout the entire range of values of M.

As in the case of the bellows of the devices 40, 42, and 44, the moment arms of the bellows 134, 136 and 138 are adjustable in order that the moment arm of the output bellows 138 may be adjusted relative to the moment arms of the input bellows so that it is possible to obtain the desired range of output pressures P5 for the device 48.

The device 50 comprises a lever system for providing an output pressure P6 proportional to the mass rate of air flow (Wa) into the engine duct 12. For this purpose the device 50 comprises a lever 160 pivotally supported at 162. Five bellows 164, 166, 168, 170 and 172 are provided for exerting turning moments on the lever 160. The bellows 164 is in communication with the output passage 72 of device 40 whereby the bellows 164 is subjected to the pressure P1. The bellows 166 is in communication with the output passage 96 of the device 44 and therefore is subjected to the pressure P3. The bellows 168 is in communication with the output passage 150 of the device 48 and therefore is subjected to the pressure P5. The bellows 170 is in communication with the constant air pressure supply line 74 and has a function corresponding to the bellows 152 of the device 48. The turning moments exerted by the bellows 164, 166, 168 and 170 are balanced by the bellows 172. The bellows 172 and a nozzle 174 are in communication with the constant pressure supply 74 through a restriction 176. A portion of the lever 160 overlies the open end of the nozzle 174 to constitute an air baffle such that pivotal movement of the lever 160 resulting from a decrease in the pressure P6 in the bellows 172 results in an increase in the flow resistance of the nozzle 174 to raise P6 to the value required to balance the lever 160. The pressure P6 is the output pressure of the device 50 and is transmitted through the output passage 178.

As in the case of the device 48, it is necessary in the device 50 to compensate for the differences in the logarithmic bases of the input pressures. Assume for the moment that the input pressure P1, P3 and P5 were expressed as follows:

$$P1 = \log Ps$$
$$P3 = \log Tt$$
$$P5 = \log K$$

and that all the logarithms were to the same base. Then the bellows 170 would be unnecessary and since $$\log Wa = \log Ps + \log K - \tfrac{1}{2} \log Tt$$

the device 50 would provide the proper output pressure P6 if the bellows 164, 168 and 172 all had the same moment arms and the bellows 166 had ½ this moment arm. This is on the assumption that said bellows all have the same diameter.

As already discussed, because the devices 40, 44 and 48 are designed to operate with a predetermined range of output pressures, the pressures P1, P3 and P5 actually are expressed in terms of P1, T$t$ and K as follows;

$$P1 = a + \log_{R1} Ps = a + A \log_R Ps$$
$$P3 = c + \log_{R3} Tt = c + C \log_R Tt$$
$$P5 = e + \log_{R5} K = e + E \log_R K$$

where the constants A, C and E result from conversion to a common logarithmic base R. Similarly the device 50 is to operate with a predetermined range of output pressure P6, for example of 3 to 15 p. s. i. so that the relation between P6 and W$a$ is as follows;

$$P6 = f + \log_{R6} Wa = f + F \log Wa$$

where F is a constant which results from conversion to said common logarithmic base R and $f$ is a constant which can be determined from the limits of P6 and W$a$. Therefore the moment arms of the bellows 164, 166, 168 and 172 are made inversely proportional to the constants A, 2C, E and F respectively. The reason for the moment arm of the bellows 166 being measured by the inverse of 2C instead of C results from the ½ term in the expression for log W$a$. The bellows 170 has a moment arm and diameter such as to apply a constant turning moment equal in magnitude but in a direction opposite to a turning moment equal to the algebraic sum of the turning moments exerted by pressures of $a$, $c$, and $e$ in the input bellows 164, 166 and 168 respectively.

The turning moment to be exerted by the bias bellows 170 can also be determined experimentally. Thus for a given set of values of P$s$, T$t$ and K, the mass air flow W$a$ into a particular ram jet engine can be calculated. Then from the equations previously stated the pressure P1, P3, P5 and P6 can be computed. With the bellows 164, 166, 168 and 172 set with moment arms of the proper relative magnitudes, as previously described, pressures P1, P3 and P5 equal to their said computed values are applied to the bellows 164, 166 and 168 respectively. Finally the turning moment exerted by the bias bellows 170 is adjusted until the pressure P6 is equal to said computed value.

The device 54 combines the output pressures P4 and P6 of the devices 46 and 50 respectively to provide an output pressure P7 which controls the rate of fuel flow to the engine combustion chamber 22 to maintain a predetermined fuel to air ratio of the combustible mixture supplied to said chamber. The device 54 comprises a lever 190 pivoted at 192. A bellows 194 exerts a turning moment on said lever, said bellows being in communication with the output pressure P4 of the device 46. A second bellows 196 exerts a turning moment in the opposite direction on said lever, said bellows being in communication with the output pressure P6 of the device 50. The difference in the turning moments exerted by the bellows 194 and 196 is balanced against a spring 198 which is loaded by a bellows 200 to which a pressure P8 is supplied as hereinafter described.

A nozzle 202 is in communication with the air supply passage 74 through a restrction 204. A portion of the lever 190 overlies the open end of the nozzle 202 to act as an air baffle therefore such that, for example, an increase in the pressure P4 decreases the flow resistance through the nozzle 202. A passage 206 is in communication with the nozzle 202 whereby the pressure P7 in said passage is the output pressure of the device 54 which is controlled by the lever 190 as a result of changes in the relative magnitudes of the pressures P4, P6 and P8.

The input pressure P4 to the device 54 is proportional to log W$f$ and the input pressure P6 is proportional to log W$a$. In order to take into account the difference in the logarithmic bases of the pressures P4 and P6 supplied to the bellows 194 and 196 their relative moment arms are set as described in connection with the input bellows of the devices 48 and 50. In addition a bellows 208 communicating with the constant pressure supply passage 74, is provided for exerting a constant turning moment against the lever 190 in order to take into account the absence of a strict mathematical proportionality between P4 and log W$f$ and between P6 and log W$a$. Thus the bellows 208 of the device 54 corresponds to the bellows 152 and 170 of the devices 48 and 50 respectively. Accordingly the device 54 subtracts the turning moments exerted by the pressures P4 and P6 on the lever 190 to provide a turning moment which is proportional to log W$f$/W$a$ and this turning moment is subtracted from that exerted by the pressure P8 through the spring 198 to provide an output pressure P7 which increases and decreases with increase and decrease respectively of the log W$f$/W$a$ from a value set by the pressure P8.

The output pressure P7 of the device 54 controls the rate of fuel flow to the engine combustion chamber 22. Thus as schematically illustrated in Fig. 3, the output pressure P7 is applied to a bellows 210 which acts against a spring 212 to position a valve 214 regulating the rate of fuel flow through the line 26 such that each rate of fuel flow through the line 26 corresponds to a particular magnitude of the pressure P7. It obviously is not essential that the rate of fuel flow be controlled by regulating the position of a valve in the fuel line. For example the pressure P7 could be used for varying the speed of a fuel pump in a manner similar to that described in copending application Serial No. 113,517, filed September 1, 1949, said pump supplying fuel to the line 26.

For a given pressure P8 in the bellows 200, the device 54 will operate to vary the rate of fuel flow to the engine combustion chamber 22 to maintain a constant fuel-air ratio of the combustible mixture supplied to said chamber. The magnitude of this fuel-air ratio and therefore the thrust output of the engine can be varied by varying the pressure P8.

Bellows 216, 218 and 220 also act against the lever 190 to provide a follow-up adjustment of said lever in response to a change in the output pressure P7 of the device 54. For this purpose the bellows 216 is in relatively unrestricted communication with the output passage 206 of the device 54 and exerts a turning moment on the lever 190 in a direction opposing a change in the output pressure P7. The bellows 218 is in communication with said output passage 206 through a restriction 222 and exerts a turning moment in the same direction as the bellows 216. The bellows 220 is in communication with said output passage 206 through a restriction 224 in series with the restriction 222 and this latter bellows exerts a turning moment on the lever 190 opposing and normally balancing the turning moments of the bellows 216 and 218. As illustrated the bellows 216, 218 and 220 all have the same moment arms and therefore, in order that the bellows 220 normally balances the combined turning moments of the bellows 216 and 218, the combined area of the bellows 216 and 218 is equal to that of the bellows 220. With the addition of the bellows 218 and 220, the instantaneous magnitude of the output pressure P7 not only is a function of the magnitude of the departure of the fuel-air ratio from the set value but also is a function of the rate of change of said departure and a function of the time integral of said departure.

The engine 10 is designed to operate between a minimum and a maximum fuel to air ratio, the thrust output of the engine being a minimum at said minimum fuel to air ratio and being a maximum at said maximum fuel to air ratio. The bellows 200 is positioned so that a change in its pressure P8 from its minimum to its maximum value varies the output pressure P7 of the device 54 such that when P8 is a minimum the fuel to air ratio is said minimum value and when P8 is a maximum the fuel to air ratio is said maximum value. In order to prevent engine operation outside of said fuel to air ratio range stops 230 and 232 are provided to limit the maximum and minimum force that can be exerted by the bellows 200 against the lever 190.

The pressure in the bellows P8 may be controlled directly by the pilot or, in the case of remotely controlled aircraft, directly by the guidance equipment of said aircraft. As illustrated in Fig. 3, however, the pressure P8 is controlled by a device 52 which provides an output pressure which is proportional to the deviation of the logarithm of the Mach No. (M) of the aircraft flight speed from a set value.

The device 52 comprises a lever 230 pivotally mounted at 232. A bellows 234 exerts a turning moment on the lever 230, said bellows being in communication with the output pressure P1 of the device 40. A bellows 236 exerts a turning moment in the opposite direction on the lever 230, the bellows 236 being in communication with the output pressure P2 of the device 42. The difference in the turning moments exerted by the bellows 234 and 236 is balanced against a spring 238. The force exerted by the spring 238 is adjustable by means of the screw 240 either by the pilot or, in the case of remotely controlled aircraft, by the guidance equipment of said aircraft.

A nozzle 242 is in communication with the air supply passage 74 through a restriction 244. A portion of the lever 230 overlies the open end of the nozzle 242 to act as an air baffle therefor such that an increase in the pressure P1 increases the flow resistance of the nozzle 242. A passage 246 is in communication with the nozzle 242 whereby the pressure P8 in said passage is the output pressure of the device 52 and is controlled by the lever 230 as a result of changes in the relative magnitudes of the pressures P1 and P2 and the force exerted by the spring 238.

The input pressure P1 to the device 52 is proportional to the log Ps and the input pressure P2 is proportional to log Pi. The difference in the logarithmic bases of the pressures P1 and P2 is taken into account by setting the relative moment arms of the bellows 234 and 236 as described in connection with the input bellows of the device 48. The constant turning moment which must also be exerted against the lever 230, to compensate for the absence of a strict mathematical proportionality between P1 and log Ps and between P2 and log Pi, is included in the force of the spring 238. Accordingly the device 52 subtracts the turning moments exerted by the pressures P1 and P2 on the lever 230 to provide a turning moment which is proportional to a log Pi/Ps which in turn is proportional to a function of log M since as previously stated M is a function of Pi/Ps. The turning moment log M is subtracted from that exerted by the spring 238 to provide an output pressure P8 which increases and decreases with increase and decrease, respectively, of log M from a value set by the spring 238. Accordingly the output pressure of the device 52 is proportional to the deviation of log M from a set value.

The device 52 includes bellows means to provide a follow-up adjustment of the lever 230 in response to a change in its output pressure similar to the follow-up bellows means of the device 54. For this purpose the bellows 248, 250 and 252 also act against the lever 230. The bellows 248 is in relatively unrestricted communication with the output passage 246 of the device 52 and exerts a turning moment on the lever 230 in a direction opposing a change in the output pressure P8. The bellows 250 is in communication with said output passage 246 through a restriction 254 and exerts a turning moment on the lever 230 in the same direction as the bellows 248. The bellows 252 is in communication with said output passage through a second restriction 256 in series with the restriction 254 and this latter bellows exerts a turning moment on the lever 230 opposing and normally balancing the turning moments of the bellows 248 and 250. For this purpose the bellows 248, 250 and 252 all have the same moment arms and the combined area of the bellows 248 and 250 is equal to that of the bellows 252. With the addition of the bellows 250 and 252, the instantaneous magnitude of the output pressure P8 not only is a function of the magnitude of the departure of log M from the set value but also is a function of the rate of change of said departure and a function of the time integral of said departure.

Obviously the pneumatic control system described is not limited to the precise structure of its components illustrated in Fig. 3. For example the device 40 could be replaced by a construction such as illustrated in Fig. 5.

In Fig. 5 a bellows 260 is subjected to the static pressure Ps transmitted by the passage 34 of the Pitot-static tube 30. Expansion of the free end of the bellows is opposed by a spring 262. The free end of the bellows 260 is connected to a valve 264. The valve 264 controls the rate of air bleed from a passage 266 which in turn is connected to a source of constant air pressure, as the line 74, through a restriction 268. With this construction, the air pressure in the passage 266 and in the output passage 270 is a function of the pressure Ps in the bellows. The nature of this function is controlled by the profile of the valve 264 and said valve may be profiled so that said output pressure is proportional to the logarithm of Ps.

The device 44 could be dispensed with in the case of aircraft operating, for example, at high altitudes at which Tt is substantially constant.

By way of summary the apparatus of Fig. 3 operates as follows: The devices 40, 42, 44 and 46 provide pressures P1, P2, P3 and P4 which are respectively proportional to the logarithms of the static pressure Ps of the air entering the duct 12, the impact pressure Pi of said air, the total temperature Tt of said air, and the mass rate of fuel flow Wf to the jet engine combustion chamber. The device 48 in effect subtracts the pressure P1 from the pressure P2 to provide a turning moment which is subtracted from a variable turning moment exerted by the spring 142 to provide a pressure P5 proportional to the logarithm of a factor K, said factor K depending on the Mach number of the air flow entering the duct 12 and on the specific geometry of said duct. The device 50, in effect algebraically adds the pressures P1, P3 and P5 to provide a pressure P6 proportional to the logarithm of the rate of mass air flow Wa to the jet engine combustion chamber in accordance with the equation $$\log Wa = \log Ps + \log K - \tfrac{1}{2} \log Tt$$

The device 54 in effect subtracts the pressures P4 and P6 to provide a pressure P7 which, for a constant biasing pressure P8, is proportional to log Wf/Wa. The pressure P7 controls the fuel valve 214 so that, for a constant pressure P8, the rate of fuel flow to the jet engine combustion chamber is regulated to maintain a constant fuel to air ratio of the combustible mixture supplied to said chamber. The device 52 controls the magnitude of the pressure P8 thereby controlling the magnitude of said fuel to air ratio whereby the engine thrust output varies with changes in P8. The device 52 in effect subtracts the pressure P2 from the pressure P1 to provide a turning moment proportional to log M (Mach number) which turning moment is subtracted from that exerted by the spring 238 whereby the pressure P8 is proportional to the deviation of log M from a value set by said spring. In this way the fuel to air ratio is adjusted (between the limits provided by the stops 230 and 232) upon deviation of the flight speed from a set value so as to vary the engine thrust output to maintain the desired flight speed.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. Apparatus for measuring the mass rate of gas flow through a duct; said apparatus comprising means responsive to the static pressure of the gas in said duct to provide a first signal which is proportional to said static pressure; means responsive to the impact pressure of said gas flow to provide a second signal which is proportional to said impact pressure; means responsive to said first and second signals to provide a third signal which is proportional to a function of the ratio of said impact pressure to said static pressure; and means, including a first device responsive only to said first of said signals and a second device responsive only to said third of said signals, for combining said first and third signals to provide a fourth signal which is a measure of said mass gas flow rate.

2. Apparatus for measuring the mass rate of gas flow through a duct; said apparatus comprising means responsive to the static pressure of the gas in said duct to provide a first signal (X1) which is proportional to the logarithm of said static pressure; means responsive to the impact pressure of said gas flow to provide a second signal (X2) which is proportional to the logarithm of said impact pressure; means responsive to said first and second signals to provide a third signal (X3) which is proportional to the logarithm of a function of the ratio of said impact pressure to said static pressure such that, at a constant total temperature of the gas in said duct, the logarithm of said mass gas flow rate is proportional to $X1+X3$; and means, including a first device responsive only to said first of said signals and a second device responsive only to said third of said signals, for combining said first and third signals to provide a fourth signal which is a measure of said mass gas flow rate.

3. Apparatus for measuring the mass rate of gas flow through a duct; said apparatus comprising means responsive to the static pressure of the gas in said duct to provide a first signal which is proportional to said static pressure; means responsive to the impact pressure of said gas flow to provide a second signal which is proportional to said impact pressure; means responsive to the temperature of the gas in said duct to provide a third signal which is proportional to said temperature; means responsive to said first and second signals to provide a fourth signal which is proportional to a function of the ratio of said impact pressure to said static pressure; and means responsive to said first, third and fourth signals to provide a fifth signal which is a measure of said mass gas flow rate.

4. Apparatus for measuring the mass rate of gas flow through a duct; said apparatus comprising means responsive to the static pressure of the gas in said duct to provide a first signal (X1) which is proportional to the logarithm of said static pressure; means responsive to the impact pressure of said gas flow to provide a second signal (X2) which is proportional to the logarithm of said impact pressure; means responsive to the temperature of the gas in said duct to provide a third signal (X3) which is proportional to the logarithm of said temperature; means responsive to said first and second signals to provide a fourth signal (X4) which is proportional to the logarithm of a function of the ratio of said impact pressure to said static pressure such that the logarithm of said mass gas flow rate is proportional to $X1+X4-\frac{1}{2}X3$; and means responsive to said second, third and fourth signals to provide a fifth signal which is a measure of said mass gas flow rate.

5. A control system for a jet aircraft power plant having a combustion chamber, means for regulating the supply of fuel to said chamber and an air intake duct for supplying air to said chamber for combustion of said fuel; said system comprising means responsive to the static pressure of the air stream entering said duct to provide a first signal which is proportional to the logarithm of said static pressure; means responsive to the impact pressure of said air stream to provide a second signal which is proportional to the logarithm of said impact pressure; means responsive to the temperature of said air stream to provide a third signal proportional to the logarithm of said temperature; means responsive to said first, second and third signals to provide a fourth signal which is proportional to the logarithm of the rate of mass air flow entering said duct; means responsive to the rate of fuel flow to said combustion chamber to provide a fifth signal which is proportional to the logarithm of said fuel flow rate; and means responsive to said fourth and fifth signals and operatively connected to said fuel regulating means for effecting an increase in the rate of fuel supply to said combustion chamber in response to an increase in said fourth signal and in response to a decrease in said fifth signal.

6. A control system for a jet aircraft power plant having a combustion chamber, means for regulating the supply of fuel to said chamber and an air intake duct for supplying air to said chamber for combustion of said fuel; said system comprising means responsive to the static pressure of the air stream entering said duct to provide a first signal which is proportional to the logarithm of said static pressure; means responsive to the impact pressure of said air stream to provide a second signal which is proportional to the logarithm of said impact pressure; means responsive to the temperature of said air stream to provide a third signal proportional to the logarithm of said temperature; means responsive to said first and second signals to provide a fourth signal which is proportional to the logarithm of a function of the ratio of said impact pressure to said static pressure; means responsive to said first, third and fourth signals to provide a fifth signal which is proportional to the logarithm of the rate of mass air flow entering said duct; means responsive to the rate of fuel flow to said combustion chamber to provide a sixth signal which is proportional to the logarithm of said fuel flow rate; and means responsive to said fifth and sixth signals and operatively connected to said fuel regulating means for effecting an increase in the rate of fuel supply to said combustion chamber in response to an increase in said fifth signal and in response to a decrease in said sixth signal.

7. A control system for a jet aircraft power plant having a combustion chamber, means for regulating the supply of fuel to said chamber and a forwardly directed air intake duct for supplying air to said chamber for combustion of said fuel; said system comprising means responsive to the static pressure of the air stream entering said duct to provide a first fluid pressure which is proportional to the logarithm of said static pressure; means responsive to the impact pressure of said air stream to provide a second fluid pressure which is proportional to the logarithm of said impact pressure; means responsive to the temperature of said air stream to provide a third fluid pressure proportional to the logarithm of said temperature; means responsive to said first, second and third fluid pressures to provide a fourth fluid pressure which is proportional to the logarithm of the rate of mass air flow entering said duct; means responsive to the rate of fuel flow to said combustion chamber to provide a fifth fluid pressure which is proportional to the logarithm of said fuel flow rate; and means responsive to said fourth and fifth fluid pressures and operatively connected to said fuel regulating means for effecting an increase in the rate of fuel supply to said combustion chamber in response to an increase in said fourth fluid pressure and in response to a decrease in said fifth fluid pressure.

8. A control system for a jet aircraft power plant; having a combustion chamber, means for regulating the supply of fuel to said chamber and a forwardly directed air intake duct for supplying air to said chamber for combustion of said fuel; said system comprising means responsive to the static pressure of the air stream entering said duct to provide a first fluid pressure which is proportional to the logarithm of said static pressure; means responsive to the impact pressure of said air stream to provide a second fluid pressure which is proportional to the logarithm of said impact pressure; means responsive to the temperature of said air stream to provide a third fluid pressure proportional to the logarithm of said temperature; means responsive to said first, second and third fluid pressures to provide a fourth fluid pressure which is proportional to the logarithm of the rate of mass air flow entering said duct; means responsive to the rate of fuel flow to said combustion chamber to provide a fifth fluid pressure which is proportional to the logarithm of said fuel flow rate; means responsive to said fourth and fifth fluid pressures to provide a sixth fluid pressure which increases with increase of said fourth fluid pressure and with decrease of said fifth fluid pressure; and means responsive to said sixth fluid pressure and connected to said fuel regulating means for increasing and decreasing the rate of fuel supply to said combustion chamber with increase and decrease in said sixth fluid pressure.

9. A control system for a jet aircraft power plant having a combustion chamber, means for regulating the supply of fuel to said chamber and a forwardly directed air intake duct for supplying air to said chamber for combustion of said fuel; said system comprising means responsive to the static pressure of the air stream entering said duct to provide a first fluid pressure which is proportional to the logarithm of said static pressure; means responsive to the impact pressure of said air stream to provide a second fluid pressure which is proportional to the logarithm of said impact pressure; means resonsive to the temperature of said air stream to provide a third fluid pressure proportional to the logarithm of said temperature; means responsive to said first, second and third fluid pressures to provide a fourth fluid pressure which is proportional to the logarithm of the rate of mass air flow entering said duct; means responsive to the rate of fuel flow to said combustion chamber and providing a fifth fluid pressure which is proportional to the logarithm of said fuel flow rate; means for providing a sixth fluid pressure, said last-mentioned means including a member movable back and forth for respectively increasing or decreasing said sixth fluid pressure; means responsive to said fourth fluid pressure for moving said member in one direction; means responsive to said fifth fluid pressure for moving said member in the opposite direction; and means responsive to said sixth fluid pressure and connected to said fuel regulating means for effecting an increase in the rate of fuel supply to said combustion chamber in response to an increase in said fourth fluid pressure and in response to a decrease in said fifth fluid perssure.

10. A control system for a jet aircraft power plant having a combustion chamber, means for regulating the supply of fuel to said chamber and a forwardly directed air intake duct for supplying air to said chamber for combustion of said fuel; said system comprising means responsive to the static pressure of the air stream entering said duct to provide a first fluid pressure which is proportional to the logarithm of said static pressure; means responsive to the impact pressure of said air stream to provide a second fluid pressure which is proportional to the logarithm of said impact pressure; means responsive to the temperature of said air stream to provide a third fluid pressure proportional to the logarithm of said temperature; means responsive to said first and second fluid pressures to provide a fourth fluid pressure which is the logarithm of a function of the ratio of said impact pressure to said static pressure; means responsive to said first, third and fourth fluid pressures to provide a fifth fluid pressure which is proportional to the logarithm of the rate of mass air flow entering said duct; means responsive to the rate of fuel flow to said combustion chamber to provide a sixth fluid pressure which is proportional to the logarithm of said fuel flow rate; and means responsive to said fifth and sixth fluid pressures and operatively connected to said fuel regulating means for effecting an increase in the rate of fuel supply to said combustion chamber in response to an increase of said fifth pressure and in response to a decrease in said sixth pressure.

11. A control system for a jet aircraft power plant having a combustion chamber, means for regulating the supply of fuel to said chamber and an air intake duct for supplying air to said chamber for combustion of said fuel; said system comprising means for providing a first signal which is proportional to the rate of mass air flow entering said combustion chamber; means providing a second signal which is proportional to the rate of fuel flow to said combustion chamber; means responsive to said first and second signals to provide a third signal which is a measure of the fuel to air ratio of the fuel and air supplied to said combustion chamber; means responsive to said third signal and operatively connected to said fuel regulating means for effecting operation of said fuel regulating means to maintain said fuel to air ratio at a predetermined value; and means operable in response to changes in the magnitude of the aircraft flight speed for modifying the magnitude of said third signal independently of said first and second signals.

12. A control system for a jet aircraft power plant having a combustion chamber, means for regulating the supply of fuel to said chamber and an air intake duct for supplying air to said chamber for combustion of said fuel; said system comprising means for providing a first signal which is proportional to the logarithm of the rate of mass air flow entering said combustion chamber; means providing a second signal which is proportional to the logarithm of the rate of fuel flow to said combustion chamber; means responsive to said first and second signals for providing a third signal which is a measure of the difference between said first and second signals; means responsive to said third signal and operatively connected to said fuel regulating means for effecting operation of said fuel regulating means to maintain a predetermined ratio of the rates of fuel and air supply to said combustion chamber; and means operable in response to changes in the magnitude of the aircraft flight speed for modifying the magnitude of said third signal independently of said first and second signals.

References Cited in the file of this patent

UNITED STATES PATENTS

| | | |
|---|---|---|
| 1,573,850 | Naiman | Feb. 23, 1926 |
| 2,482,254 | Fairchild | Sept. 20, 1949 |
| 2,488,221 | Moore | Nov. 15, 1949 |
| 2,566,319 | Deacon | Sept. 4, 1951 |
| 2,671,620 | Andrews | Mar. 9, 1954 |

FOREIGN PATENTS

| | | |
|---|---|---|
| 517,321 | Great Britain | Jan. 26, 1940 |